Figure 1A:
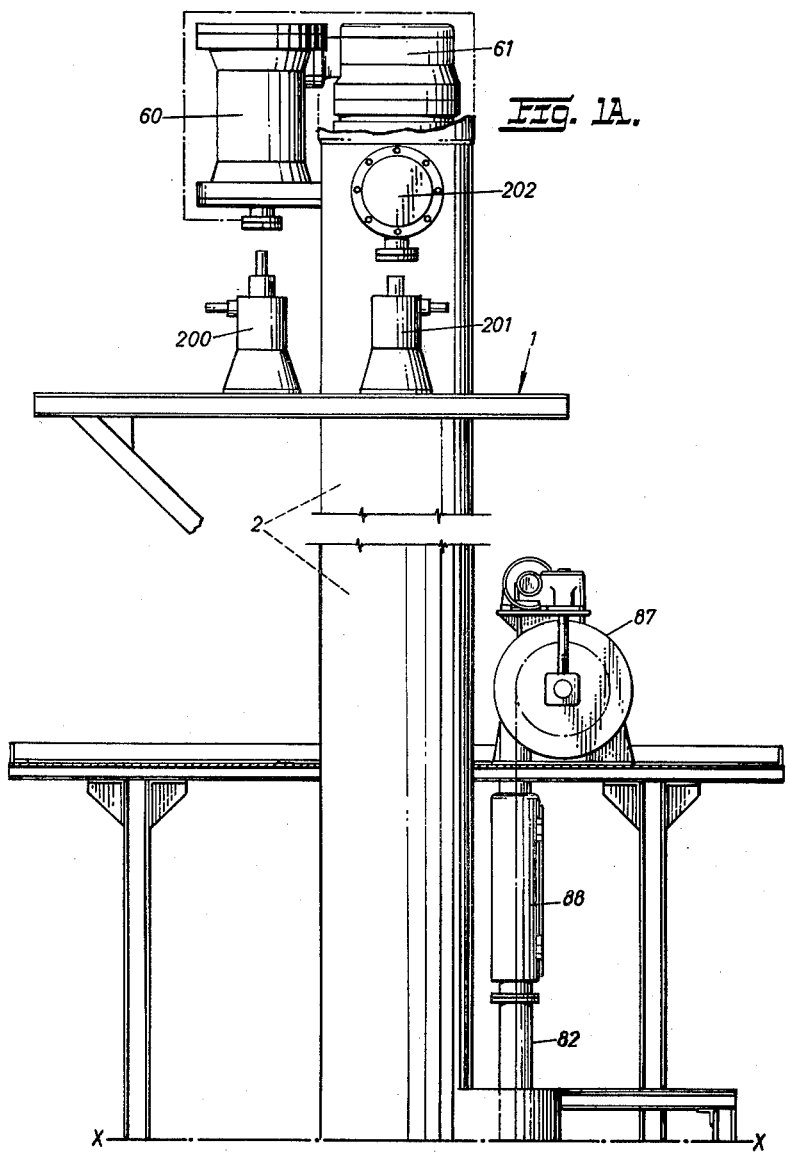

Nov. 24, 1964

E. LONG ETAL 3,158,544

FUEL CHARGING/DISCHARGING SYSTEM FOR GAS
COOLED NUCLEAR REACTOR

Filed Jan. 21, 1960

15 Sheets-Sheet 1

INVENTORS
EVERETT, LONG, GORDON PACKMAN, HERBERT
CHILVERS KNIGHTS, ERNEST EDWARD JERKINS
BY

ATTORNEYS

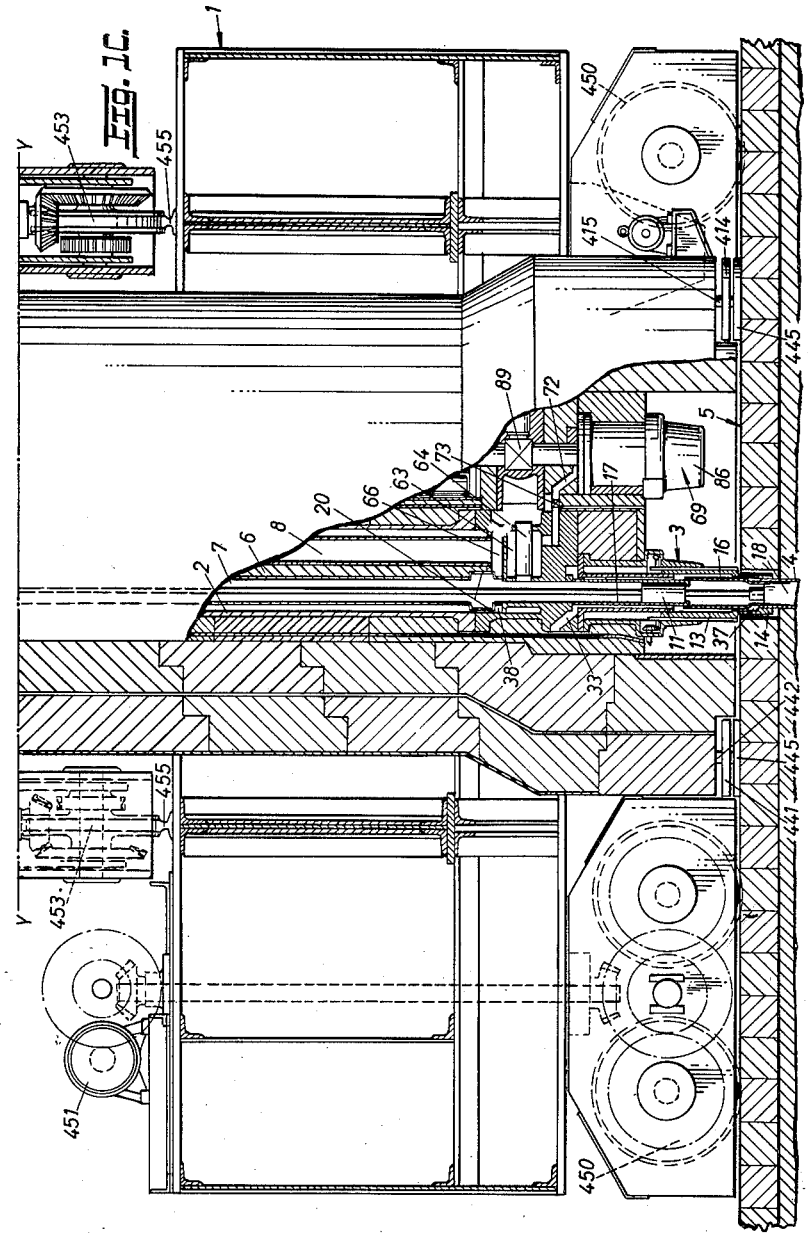

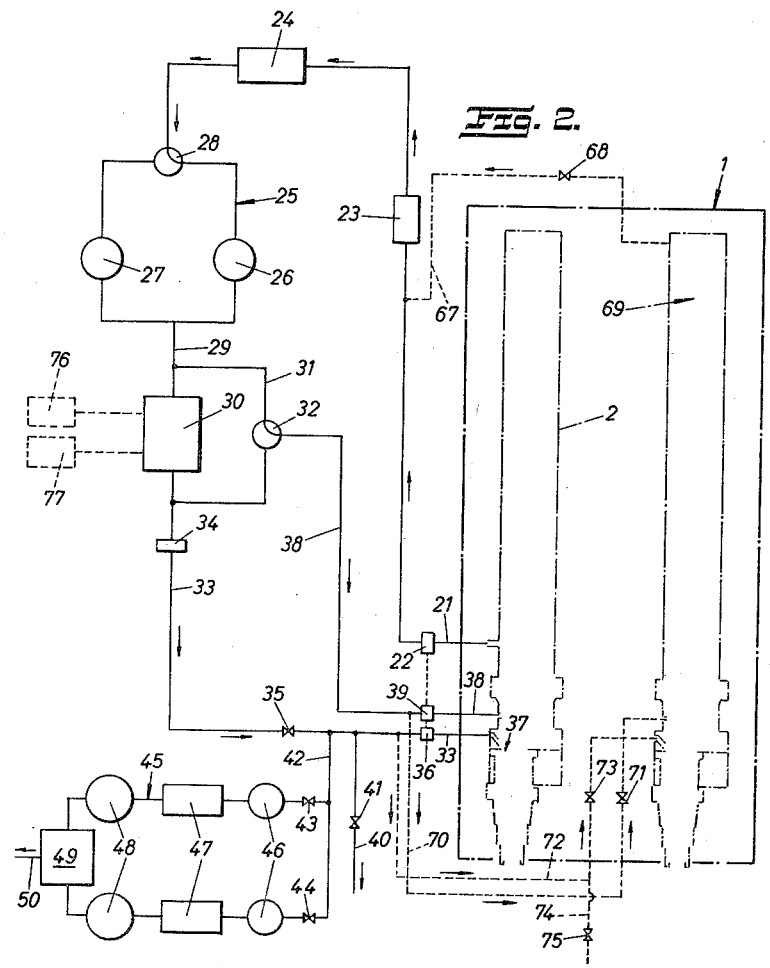

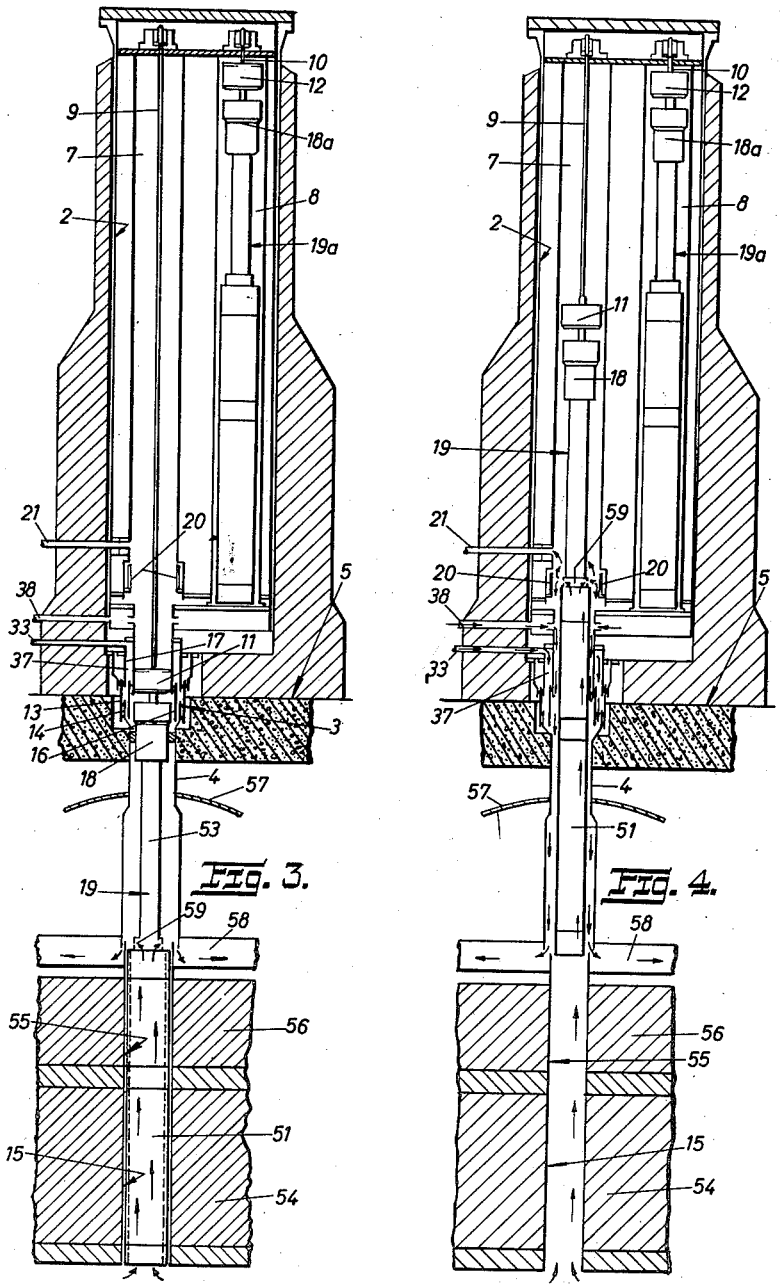

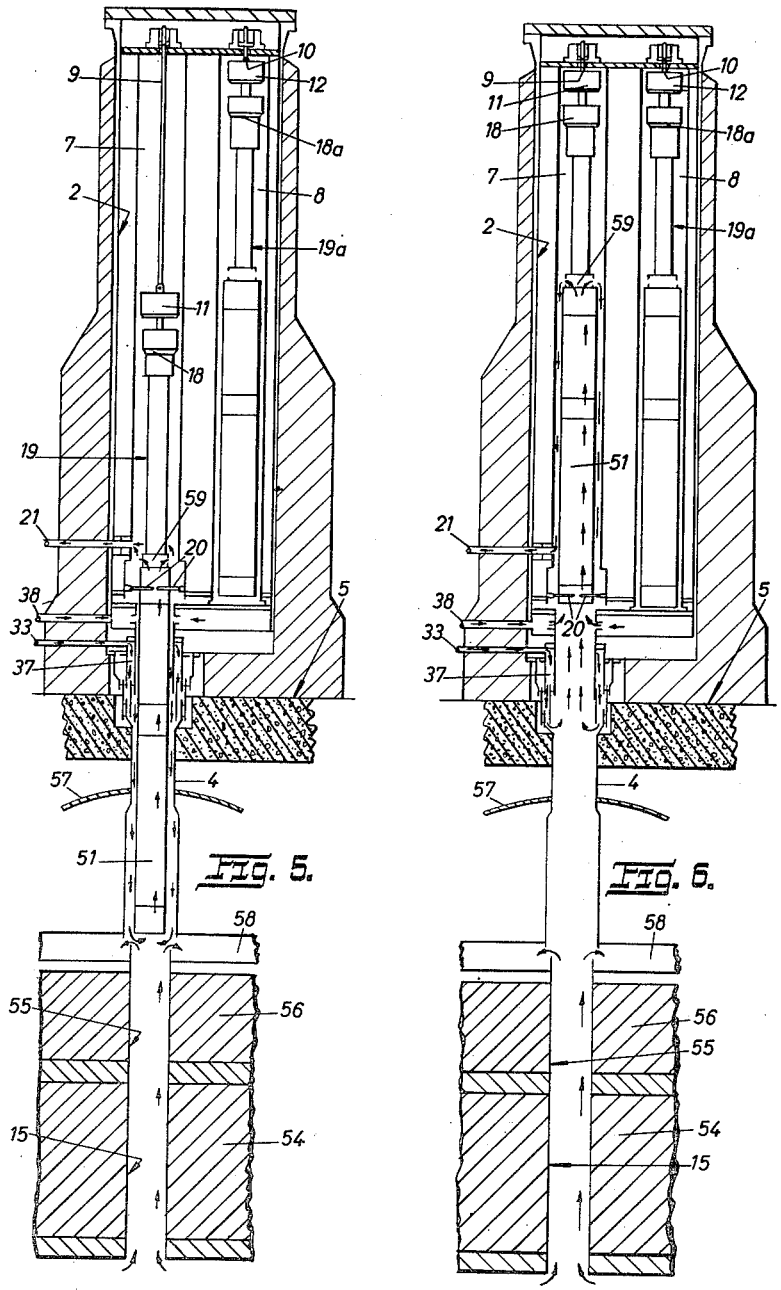

INVENTORS
EVERETT LONG, GORDON PACKMAN, HERBERT
CHILVERS KNIGHTS, ERNEST EDWARD JERKINS
BY
ATTORNEYS

INVENTORS
EVERETT LONG, GORDON PACKMAN, HERBERT CHILVERS KNIGHTS, ERNEST EDWARD JERKINS
BY
ATTORNEYS

INVENTORS
EVERETT LONG, GORDON PACKMAN, HERBERT
CHILVERS KNIGHTS, ERNEST EDWARD JERKINS

ATTORNEYS

Nov. 24, 1964    E. LONG ETAL    3,158,544
FUEL CHARGING/DISCHARGING SYSTEM FOR GAS
COOLED NUCLEAR REACTOR
Filed Jan. 21, 1960    15 Sheets-Sheet 11
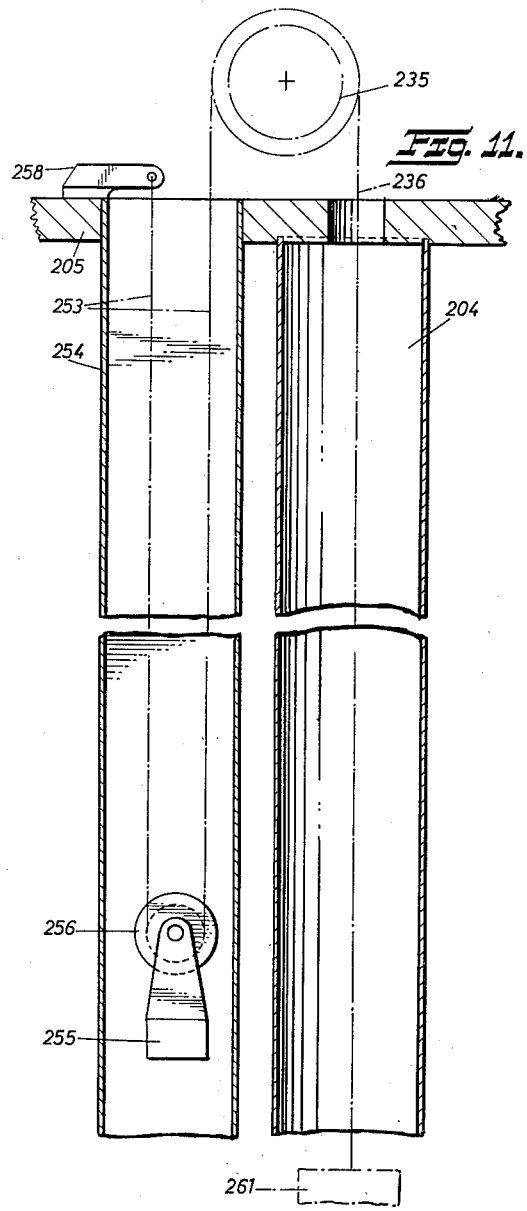
INVENTORS
EVERETT LONG, GORDON PACKMAN, HERBERT
CHILVERS KNIGHTS, ERNEST EDWARD JERKINS
BY
ATTORNEYS

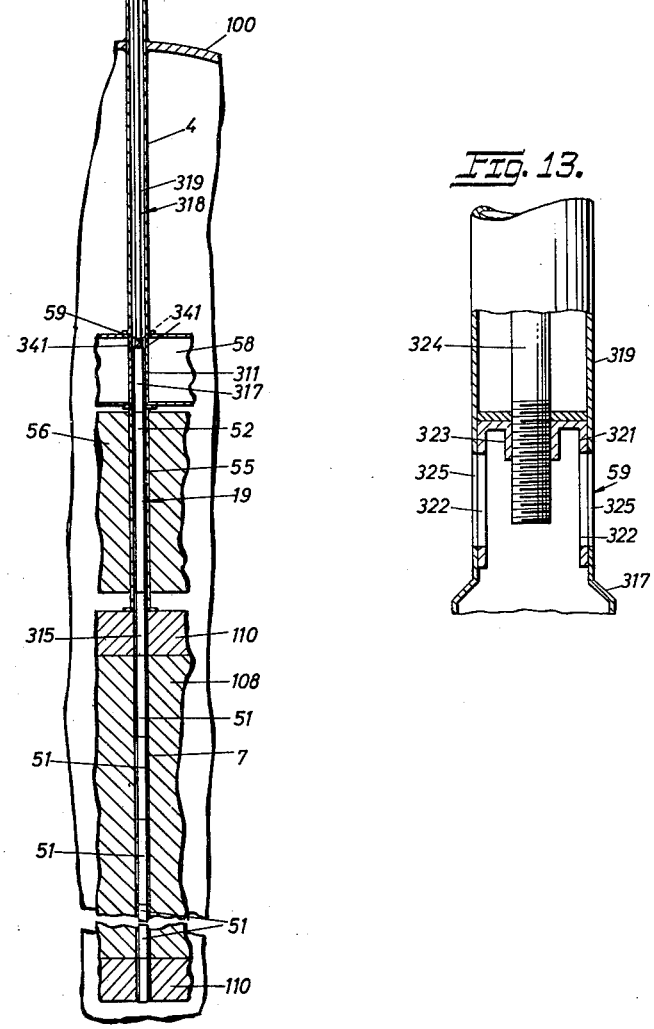

Nov. 24, 1964   E. LONG ETAL   3,158,544
FUEL CHARGING/DISCHARGING SYSTEM FOR GAS
COOLED NUCLEAR REACTOR
Filed Jan. 21, 1960   15 Sheets-Sheet 14
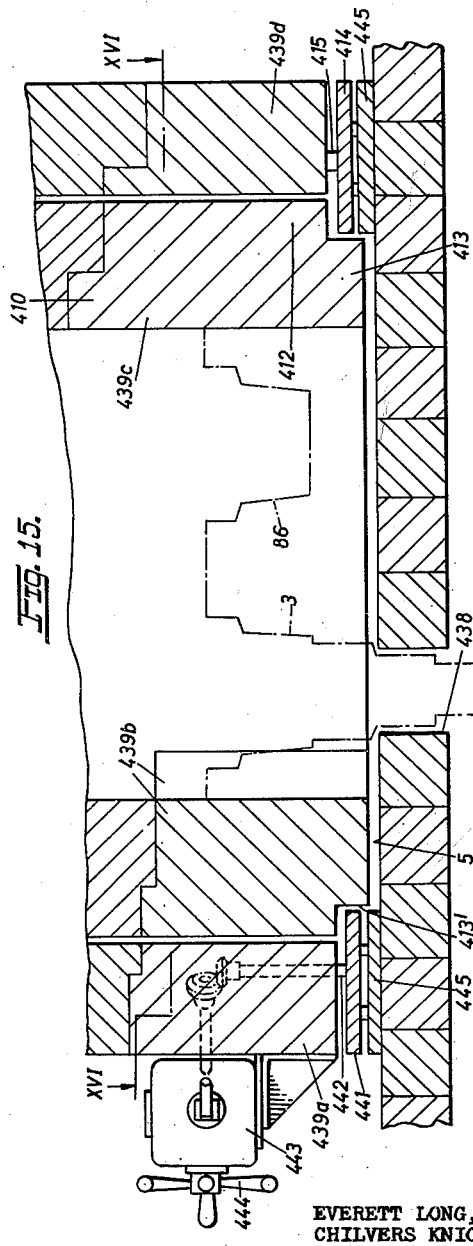
INVENTORS
EVERETT LONG, GORDON PACKMAN, HERBERT
CHILVERS KNIGHTS, ERNEST EDWARD JERKINS
BY
*Larson and Taylor*
ATTORNEYS

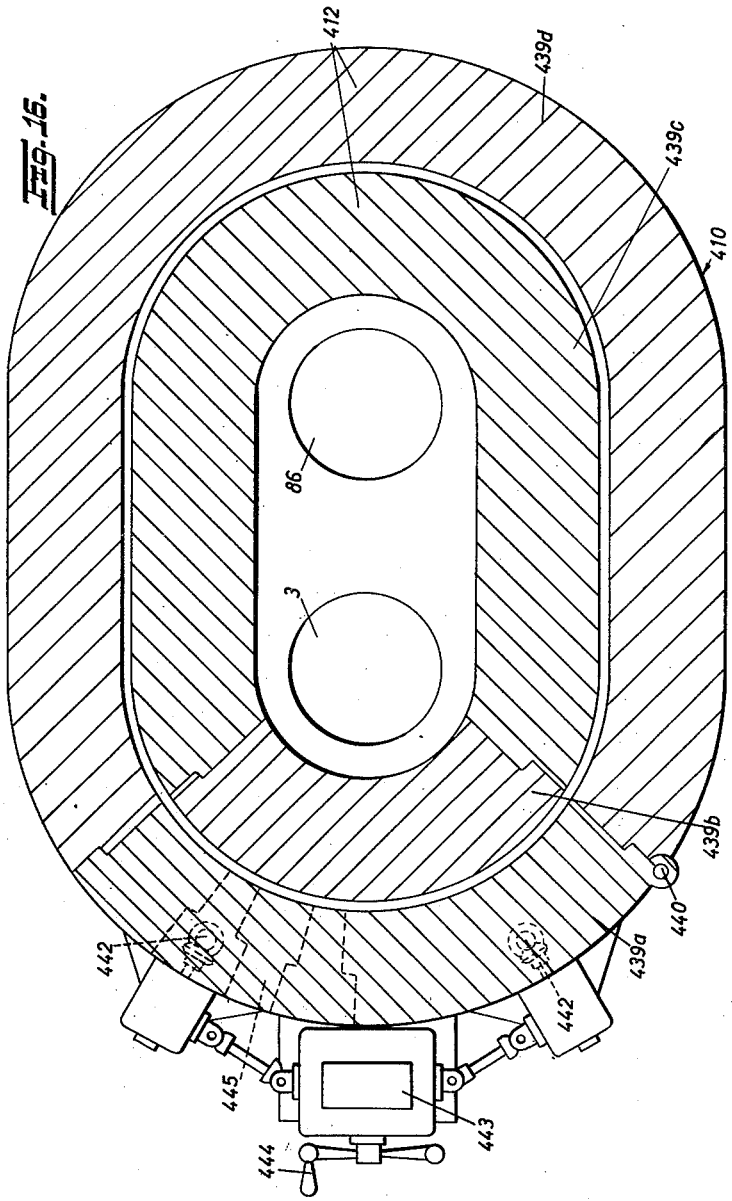

United States Patent Office 3,158,544
Patented Nov. 24, 1964

3,158,544
FUEL CHARGING/DISCHARGING SYSTEM FOR GAS COOLED NUCLEAR REACTOR
Everett Long, Gordon Packman, Herbert Chilvers Knights, and Ernest Edward Jerkins, all of Culcheth, Warrington, England, assignors to United Kingdom Atomic Energy Authority, London, England
Filed Jan. 21, 1960, Ser. No. 3,885
Claims priority, application Great Britain June 3, 1959
4 Claims. (Cl. 176—32)

This invention relates to refuelling machines for gas-cooled nuclear reactors. In the charging and discharging of fuel elements from power producing gas cooled nuclear reactors, in which gaseous coolant was circulated in closed circuit under pressure, it has hitherto been necessary to shut down the reactor and depressurise the coolant circuit before effecting refuelling operations. As this procedure is expensive of time and effort and interrupts the supply of power from the reactor, it is considered that future power producing reactors, particularly where such reactors will be required to operate under base load conditions, will of necessity have to be refuellable without shut-down and depressurisation.

Refuelling under full load conditions presents problems, one of which is the fact that a fuel element which has been subjected to irradiation continues to be heated, due to fission products, after its removal from the core of the reactor. Another problem is the necessity to preserve the integrity of the reactor coolant circuit during refuelling operations which require the opening of a passage communicating with a fuel element channel in the reactor core by removal of the usual shield plug which normally seals the passage.

According to the invention, for a gas-cooled nuclear reactor wherein the gaseous coolant is circulated under pressure in a closed circuit, a refuelling machine has incorporated in it a normally closed circuit in which gaseous coolant, being the same coolant as that employed in the reactor, can be circulated under pressure, the coolant circuit of the machine being openable to join and form part of the reactor coolant circuit and in so doing preserve the integrity of the reactor coolant circuit, whereby a fuel element discharged from the reactor by the refuelling machine can be cooled in its passage from the reactor core into the refuelling machine and also whilst it is being temporarily housed in the refuelling machine.

Figure 1B:
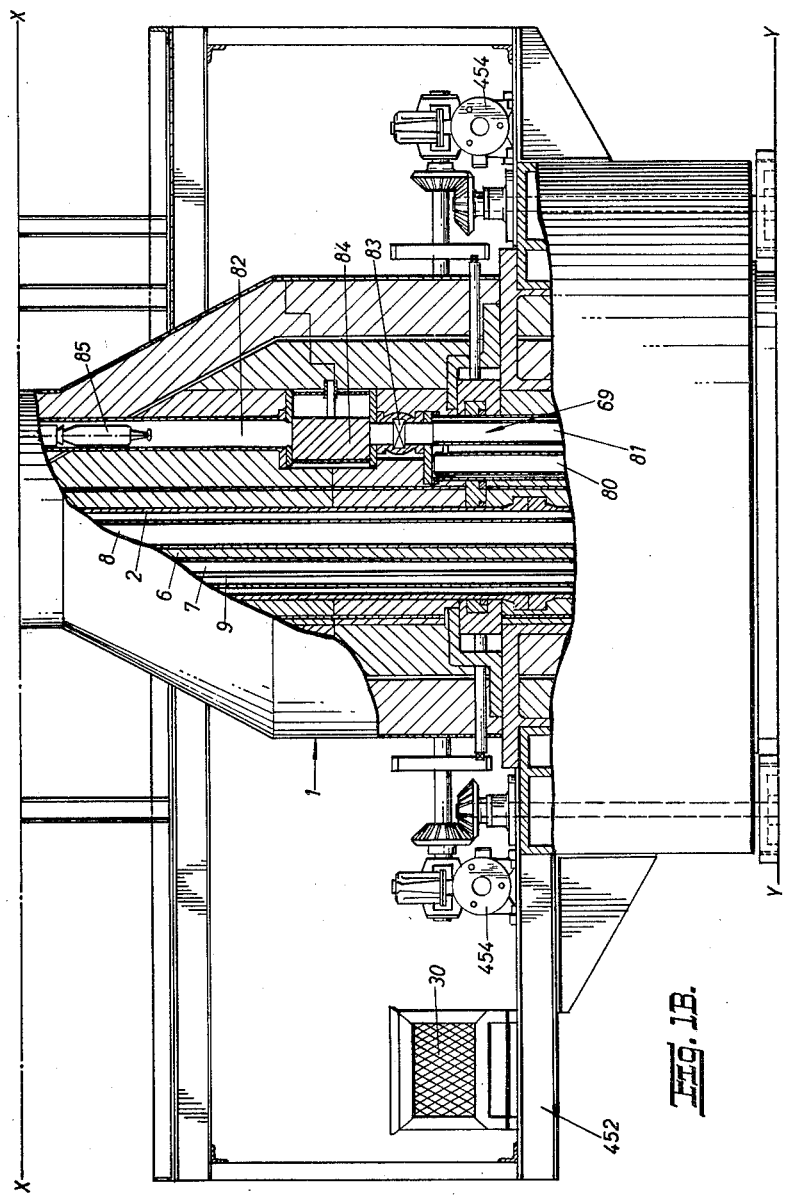
Figure 7:
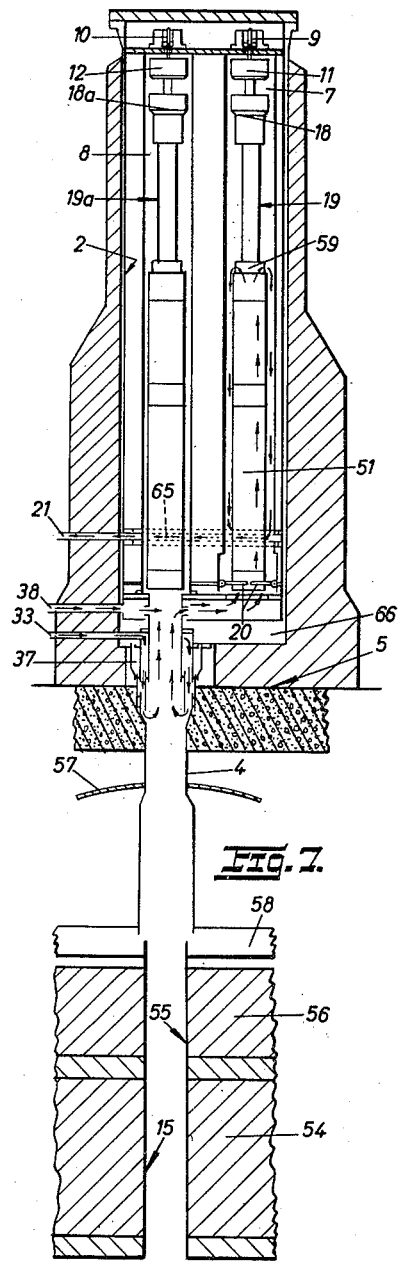
Figure 8:
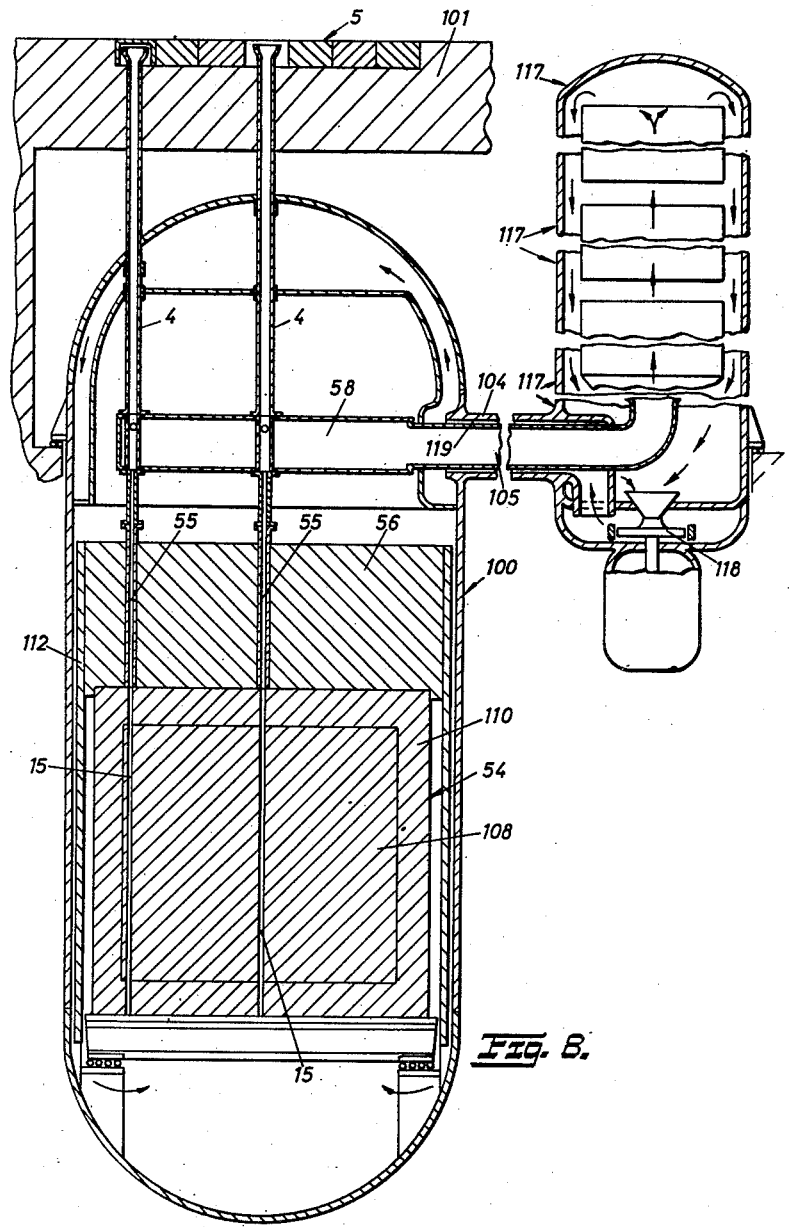
Figure 9:
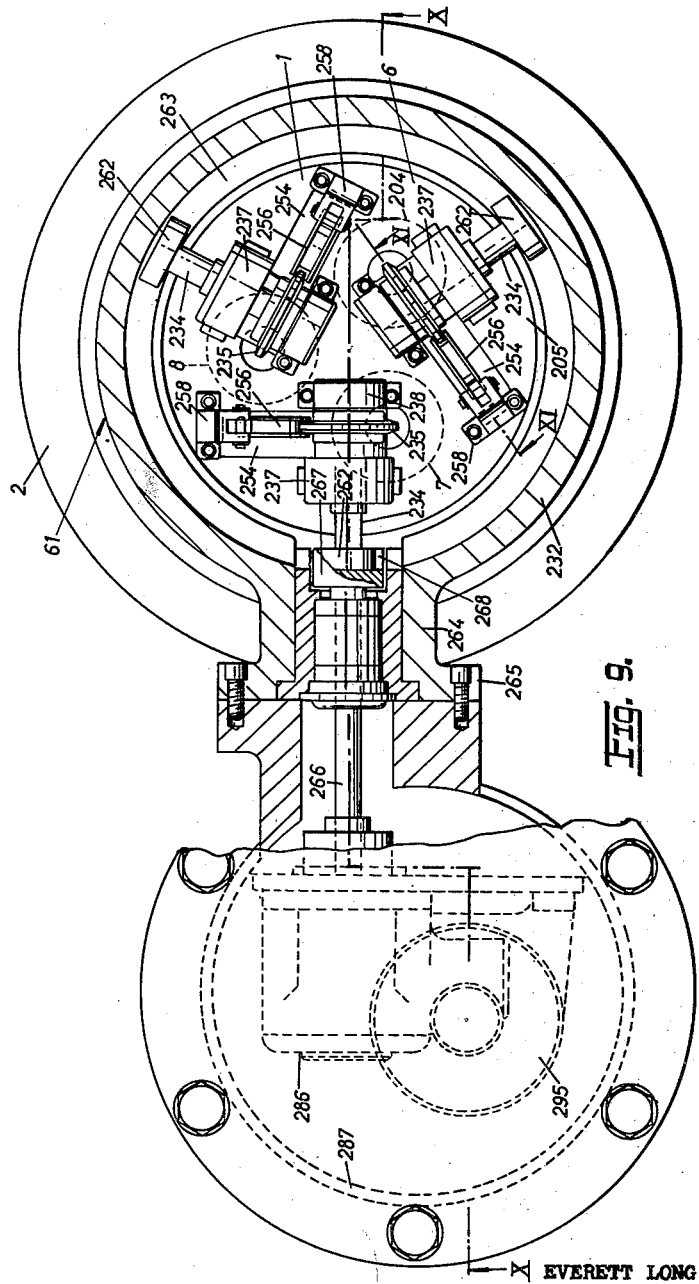
Figure 14:
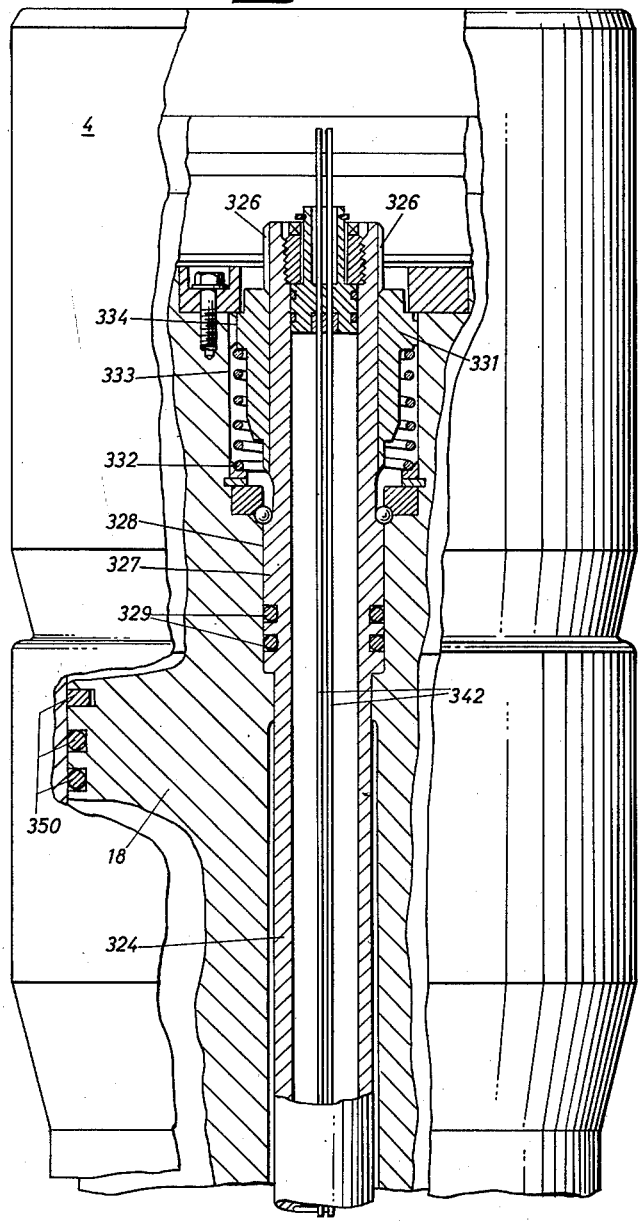

An embodiment of the invention will now be described by way of example with reference to the accompanying drawings, which are partly diagrammatic, and wherein:

FIGURES 1A, 1B and 1C are parts which when placed together along the lines X—X and Y—Y form a fragmentary side view, partly in medial section, of a nuclear reactor refuelling machine according to the invention, FIGURE 2 is a diagrammatic representation of a cooling circuit incorporated in the machine shown in FIGURES 1A, 1B and 1C, FIGURES 3 to 7 are diagrammatic side views in section showing steps in the discharging from a fuel element channel of a nuclear reactor, of a fuel element assembly by the refuelling machine shown in FIGURES 1A, 1B and 1C, FIGURE 8 is a diagrammatic side view in medial section of a nuclear reactor installation, FIGURE 9 is a plan view, partly in section and drawn to an enlarged scale, of the top portion of the refuelling machine shown in FIGURES 1A, 1B and 1C, FIGURE 10 is a fragmentary side view in section on line X—X of FIGURE 9, FIGURE 11 is a diagrammatic detached side view in section on line XI—XI of FIGURE 9 and illustrates a detail, FIGURE 12 is a fragmentary diagrammatic side view partly in section illustrating a fuel element assembly in position in the installation shown in FIGURE 8 and drawn to a larger scale than that of FIGURE 8, FIGURE 13 is a fragmentary part-sectional view, drawn to a larger scale than that of FIGURE 12, of a detail of the assembly shown in FIGURE 12, FIGURE 14 is a similar view to FIGURE 13 and illustrates another detail, and is drawn to a larger scale than that of FIGURE 13, FIGURE 15 is a fragmentary side view in medial section of the base part of the refuelling machine shown in FIGURES 1A, 1B and 1C, being drawn to a larger scale than that of FIGURES 1A, 1B and 1C, and FIGURE 16 is a plan view in section on line XVI—XVI of FIGURE 15.

Figure 10:
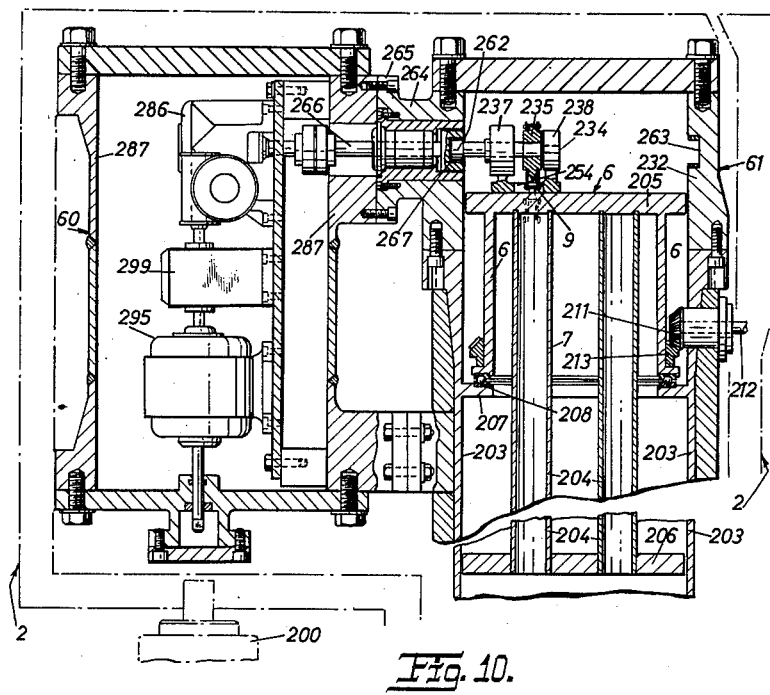

Referring to the drawings, in the construction shown therein, a refuelling machine 1 for a gas cooled nuclear reactor has a pressure vessel 2 whose lower end includes a nose piece 3 which can be moved downwardly to engage and seal with a vertical standpipe 4 of the reactor (see FIGURES 1C and 3–7) at the refuelling level (indicated by the reference numeral 5 in FIGURES 1C, 3–7, 8, 12 and 15). The pressure vessel 2 contains a vertical magazine cylinder 6 having three vertical magazine tubes, two of which are shown in FIGURES 1B, 1C, 3–7 and 9 and designated 7 and 8 respectively, the cylinder 6 being rotatable relative to the pressure vessel 2 to enable the magazine tubes to be brought in turn into axial alignment with the nose piece 3. Each magazine tube contains a hoisting chain, that in the magazine tube 7 being shown in FIGURES 1B, 1C and 3–7 and designated 9, and that in the magazine tube 8 being shown in FIGURES 3–7 and designated 10, the hoisting chain 9 carrying a seal plug 11 and the hoisting chain 10 carrying a seal plug 12. The hoisting chains are driven selectively from a single driving means 60 (FIGURES 1A and 10), the two chains, for example chain 10 in FIGURES 3–6, and chain 9 in FIGURE 7, which are not being driven are prevented from raising or lowering movement by mechanism shown in FIGURES 9–11 and described hereinafter and contained in housing 61 (FIGURES 1A, 9 and 10). The nose piece 3 has an outer generally cylindrical part 13 (see FIGURES 1C and 3–7) provided with internal annular sealing means 14 (see FIGURES 3–7) adapted to engage and seal with the outer wall of the upper end of a standpipe 4 which communicates with a vertical fuel element channel 15 (see FIGURES 3–7 and 8) in the reactor core. The nose piece 3 also has an inner generally cylindrical member 16 (see FIGURES 1C and 3–7) coaxial with the outer part 13 and adapted to locate within the standpipe 4 engaged by the outer part 13 and extend downwardly therein adjacent the sealing means 14 with clearance from the inner wall of the standpipe 4 so that an annular passage 37 is provided between the interior of the standpipe 4 and the inner member 16. The interior of the member 16 communicates with the magazine cylinder 6, via a fixed tube 17 (FIGURES 1C and 3–7) extending upwardly to the magazine cylinder 6 and on which the inner member 16 of the nose piece 3 can slide in sealing contact on movement of the nose piece 3. The fixed tube 17 has an annular seating for sealing engagement by the seal plug for example 11 or 12 suspended from that hoisting chain 9 or 10 respectively extending through that magazine tube 7 or 8 which is aligned with the nose piece 3. The respective seal plug is provided with a telescopic coupling member for connection by means of a releasable ball-latch coupling to a biological shield plug 18 forming the upper end of a fuel element assembly 19, the biological shield plug 18 being mechanically coupled to and sealing the respective standpipe 4 during normal burn-up. The magazine tube 7 has near its lower end a restrictor unit 20 (see particularly FIGURES 3-7) whose structure and function will be referred to hereinafter.

The refuelling machine has a coolant circulation system, shown particularly in FIGURE 2 and comprising a duct 21 (not shown in FIGURE 1C) communicating with the interior of the lower region, but above the restrictor unit 20, of that tube 7 of the magazine cylinder 6 intended to house a discharged fuel element assembly 19, the duct communicating via an emergency isolating valve 22, a pressure sensitive valve 23 and a filter 24 intended for removal of solid contaminants in the coolant, with a circulator system 25 consisting of a main circulator 26 and a stand-by circulator 27 in parallel together with a change-over valve 28, a duct from the circulator system 25 extending to a cooler 30 (see also FIGURE 1B) provided with a by-pass 31 and mixing valve 32, a duct 33 from the cooler 30 extending via a restrictor valve 34, a valve 35 for normal isolating operation from the machine control, and an emergency isolating valve 36 to communicate (see FIGURES 1C and 3-7) with the annular passage 37 (FIGURES 1C and 3-7) between the standpipe 4 and the inner member 16 of the nose piece 3, and a duct 39 extending from the mixing valve 32 via an emergency isolating valve 39 to communicate (see FIGURES 1C and 3-7) with the interior of the fixed tube 17 (FIGURES 1C and 3-7) in the pressure vessel 2. The cooler 30 may be air cooled and be provided with a fan 76 and stand-by fan 77. Additionally, the coolant system has an air bleed 40 provided with a valve 41 for the duct 33 extending to the nose piece 3 for seal cooling, and a duct 42 connected to the duct 33 and extending via valves 43, 44 to a blow down, evacuation, purging and supply facility 45 consisting of vacuum pumps 46, transfer tanks 47, compressors 48 all in parallel from a storage vessel 49 having communication via a duct 50 with chemical absorbing plant (not shown).

The coolant circulation system also has connections for applying it to an emergency facility contained in the refuelling machine 1. The emergency facility is generally similar to the normal charge-discharge facility of the refuelling machine 1, except that its magazine cylinder is shorter than that of the normal facility (see FIGURES 1A and 1B) since the emergency facility is intended only to house component parts of a fuel element assembly 19 or fragments of the fuel elements thereof in cases where the latter have become broken whilst in the reactor. To this end, any of the three magazine tubes of the emergency facility 69 (two of which are shown in FIGURE 1B and designated 80, 81 respectively) can be aligned with a through tube 82 provided with a valve 83 and removable shielding 84, a component or fragment removing grab 85 provided with a television camera being lowerable from the through tube 82 through one of the magazine tubes and into the reactor through a nose piece 86 (FIGURE 1C) of the emergency facility, the nose piece 86 being engageable in sealing manner with a reactor standpipe 4 in the manner described with reference to the nose piece 3. The grab 85 is operated by a winch 87 (FIGURE 1A) and the through tube 82 has an openable door 88 allowing for inspection and maintenance of the grab and for removal of fuel element assembly components or fuel element fragments which have been deposited by the grab in a container in one of the magazines tubes, the container itself being removed with its contents via the door 88. A valve 89 is provided beneath the magazine of the emergency facility and between the latter and the channel of the nose piece 86, whereby the integrity of the coolant circuit of the refuelling machine when applied to the emergency facility and when not joined to the reactor coolant circuit can be maintained by closure of valves 83 and 89. Referring now to FIGURE 2, the outlet duct 21 has a branch 67 (shown in dotted lines in FIGURE 2) provided with a valve 68 and communicating with any one of three chambers of the emergency facility, indicated diagrammatically by the general reference numeral 69 in FIGURE 2. The inlet duct 38 has a branch 70 provided with a vlave 71, and the inlet duct 33 has a branch 72 provided with a valve 73, the branches 70 and 72 communicating with the emergency facility 69 and, when connected thereto, fulfilling the same functions as with the normal operating part of the refuelling machine. The branch 72 also has an air bleed duct 74 provided with a valve 75 and corresponding to the duct 40 and valve 41 of the main system. Coolant flow can thus be applied to the emergency facility in the same manner as it is applied to the main facility, for cooling the nose seal of the emergency facility, and fuel element assembly components and fuel elements or parts thereof as may be handled by or stored in the emergency facility.

In describing the operation of the refuelling machine coolant system shown diagrammatically in FIGURES 3 to 7 and in making clear how it is made to co-operate with the reactor coolant system, it will be necessary briefly to describe a fuel element assembly 19 and as much of the reactor coolant system as is pertinent to an understanding of the refueling operation and cooling arrangements associated therewith. FIGURE 8 shows diagrammatically a suitable nuclear reactor installation with which the refuelling machine 1 can operate. Referring to FIGURES 3 and 8, the fuel element channels 15 (two channels only being shown in FIGURE 8 for the sake of clarity; an example of a suitable number of channels is 250) in the reactor core 54 receive coolant circulated under pressure at their lower ends, coolant flow being upwardly through the channels as shown by the arrows at the lower end of FIGURE 3. Considering one channel 15 in which is disposed a plurality of fuel elements indicated collectively by the reference numerals 51 in FIGURE 3 and in normal position for irradiation, the fuel elements 51 are inter-connected and are joined at their upper end to a neutron shield plug 52 which is in turn connected via an intermediate member 53 to a biological shield plug 18. The fuel elements 51, neutron shield plug 52 and biological shield plug 18 together comprises a fuel element assembly 19, referred to hereinafter with reference to FIGURE 12. The biological shield plug 18 normally seals, by a mechanical lock releasable only on pressure equalisation across the plug, with the upper end of a standpipe 4 communicating via a channel 55 in the neutron shield 56 (disposed above the reactor core 54 and contained together with the reflector 110 and moderator 108 forming the core 54 in a thermal shield 112) with the fuel element channel 15 in the core 54. The diameter of the standpipes 4 as shown in FIGURE 8 are exaggerated for the sake of clarity. Above the neutron shield 56, within the reactor pressure vessel 100 (the upper end of which is shown diagrammatically in FIGURES 3-7 and designated 57, is a hot box 58, whose normal function is to collect coolant flowing up the core channel 15 through the fuel elements 51 therein and through the neutron shield plug 52, leaving the interior of the lower part of the fuel element assembly 19 via a gag valve 59 disposed above the neutron shield plug 52, the gage valve 59 being adjustable for flow by means of mechanism disposed in the biological shield plug 18 and accessible from the refuelling level 5 which is constituted by the top of the biological shielding 101. The gage valve and its said mechanism will be described hereinafter with reference to FIGURES 12, 13 and 14. The reactor coolant is led from the hot box 58 out of the pressure vessel 100 and passes through passage 105 in coaxial ducting 104 to one or more heat exchangers 117 and circulators 118 and returns to the pressure vessel 100 along passage 119 of the coaxial ducting 104 and to the lower end of the fuel element channels 15. The refuelling operation begins with the refuelling machine 1 disposed with its nose piece 3 over a standpipe 4, the machine having been accurately positioned for this purpose. In the machine, the magazine cylinder 6 is in a position in which its magazine tube 7 intended to house a discharged fuel element assembly 19 is axially aligned with the nose piece 3, and the seal plug 11 depending from the hoisting chain 9 in the tube 7 engaged in sealing manner with the annular seat in the fixed tube 17. The valve 35 isolating the nose piece seal cooling duct 33 is closed, and the coolant in the machine system has its integrity maintained so that the coolant is retained under pressure by virtue of the sealing affected by the seal plug 11. The nose piece 3 is in its reacted position. A part of the lowermost shielding of the machine, hereinafter described with reference to FIGURES 15 and 16, is moved to allow manual access, the telescopic coupling member is extended and a connection is made between the telescopic coupling member on the seal plug 11 and the biological shield plug 18 by means of the ball latch provided on the former.

At the same time, thermocouple lead connections between the thermocouple leads 342 (FIGURE 14) and leads to indicating and recording means at the refuelling machine operating position are established. Whilst this operation is being performed, the interspace between the biological shield plug 18 and the machine seal plug 11 in which the manual operations are being performed can be purged with air via the air bleed 40 in the nose piece seal-cooling duct 33. After completion of the mannual connections and withdrawal of the person concerned, the movable shielding is replaced and the nose piece 3 is lowered to engage the sealing means 14 with the standpipe 4. The said interspace, by means of the facility 45 via ducts 42 and 33, is evacuated of air, purged with coolant and finally pressurized with coolant. The circulator 26 of the machine coolant system is now started. The position of the fuel element assembly is shown in FIGURE 3. Hoisting is commenced, which serves to free the biological shield plug 18 from sealing connection to the standpipe 4, pressure equalisation having operated a safety device and freed for release its mechnical lock with the standpipe 4. No reactor coolant flow takes place at first from the standpipe 4, because there is no pressure drop. The fuel element assembly 19 ascends into the refuelling machine 1, passing through the standpipe 4, nose piece inner member 16, fixed tube 17 and into the magazine tube 7. As the gag valve 59 with the fuel element assembly 19 ascends, reactor coolant passes through it from within the lower part of the fuel element assembly 19 and returns to the hot box 58 via the annular space between the assembly 19 and the tubes containing it, i.e. one or more of the standpipe 4, nose piece inner member 16 and the fixed tube 17. This position of the fuel element assembly and the coolant flow is shown in FIGURE 4. Meanwhile the nose piece sealing means 14 is being cooled by coolant via duct 33 from the machine system, which joins the return flow of reactor coolant (FIGURE 4). When the gag valve 59 reaches the restrictor unit 20, a proportion of reactor coolant begins to be taken by the machine coolant system and to pass to the machine circulator 26 via the duct 21 communicating with the said magazine tube, as shown in FIGURE 4. The restrictor unit 20 is operated, once the gag valve 59 has passed it (see now FIGURE 5), to close on the assembly 19 and block the annular passage between the assembly 19 and the magazine tube 7. The restrictor unit 20 to fulfill this function may consist of a pair of shutters each pivotted about a horizontal axis and each having semi-circular cutout portions (as shown diagrammatically in FIGURES 3-7) or may be lateral sliding shutters of the same construction (not shown) or may be of iris construction providing a circular aperture of variable diameter (not shown). Just after the restrictor unit 20 has been operated, the reactor and machine coolant circuits continue to operate together.

However, after further withdrawal into the position shown in FIGURE 5, the lower end of the fuel elements 51 rises above the hot box 58 and the two coolant circuits separate, the reactor coolant then having an unrestricted flow passage to the hot box 58. The restrictor unit 20 serves to separate the entry duct 21 to the machine circulator 26 from the two outlet ducts 38, 33 providing two coolant fractions. Coolant from the machine system is circulated to flow as shown in FIGURE 5 from the two circulator outlet ducts 38, 33 down the annular space outside the fuel element assembly 19, and into the fuel element assembly 19 at the bottom thereof, rising through the fuel element assembly 19, cooling the fuel elements 51, and leaving via the gag valve 59 to pass from thence to the inlet duct 21 to the machine circulator 26. When the lower end of the fuel element assembly 19 has passed the nose piece and achieved the position shown in FIGURE 6, the divided coolant fraction via duct 33 cooling the nose piece seal 14 to the standpipe 4 passes from thence upwardly to enter the fuel element assembly 19, joined by the other coolant flow fraction via duct 38. When the assembly 19 is fully in the magazine tube, FIGURE 6, the fuel elements 51 are subjected to constant coolant flow and as will readily be appreciated, the refuelling machine coolant system operates independently of the reactor coolant system. The magazine cylinder 6 can now be rotated to bring the magazine 8, which contains a new fuel element assembly 19a into axial alignment with the nose piece 3 and standpipe 4 (see FIGURE 7), and the new assembly can be lowered into position, the seal plug 12 on the hoisting chain 10 in the newly aligned magazine tube 8 effecting sealing to isolate the machine cooling system, the seal effected between the biological shield plug 18a of the new assembly 19a and the standpipe 4, the mechanical connection of the biological shield plug 18a with the standpipe 4 effected, the said interspace evacuated and purged with air via ducts 42 and 33 and ducts 40 and 33 respectively, the nose piece 3 unsealed and raised, the hoisting gear disconnected manually and the refuelling machine 1 moved away. The discharged fuel elements 51 continue to be cooled by the machine coolant system, the outlet duct 21 being connected to the tube 7 in its new position by a passage 65 and the outlet duct 38 communicating therewith via a passage 66, FIGURE 7, whilst charging of the new assembly 19a is being effected, and the discharged fuel element assembly 19 can be passed to a storage facility through a transit tube (not shown) extending from the refuelling level 5 through the reactor outer containment, being cooled in its passage by connection of the machine cooling system with a cooling system possessed by the storage facility.

To avoid undue distortion of the magazine cylinder 6 due to one of its tubes 7 being heated by containing a "hot" element from the reactor whilst the other two tubes (one of these being the tube 8) remain cool, the cylinder 6 is longitudinally split between the tubes along radial planes extending outwardly from the cylinder axis and dividing the cylinder 6 between the tubes, adjacent planes thus being at 120° to one another. Furthermore, to avoid stresses on the pressure vessel 2 due to longitudinal expansion of the magazine cylinder 6, the latter is made in a plurality of longitudinal sections slidingly keyed to one another whereby longitudinal expansion and contraction can take place; moreover the cylinder 6 can take up such changes in the longitudinal positions of its end supports as may be caused by differential expansion and contraction of the pressure vessel 2 which supports the magazine cylinder 6 at its ends. For the sake of clarity, neither of these constructions are shown.

To prevent damage being done by a falling seal plug caused by breaking of a hoisting chain or failure of a brake on the chain drive, each seal plug is provided with arresting gear operated on release of tension in the hoisting chain. The gear (not shown) may be of any suitable kind such as is provided for passenger carrying lifts, and acts on the wall of the tube containing the seal plug.

A lateral viewing aperture 63 (FIGURE 1C) containing a television camera 64 is conveniently provided below the restrictor unit 20 so that the progress of a fuel element assembly 19 or 19a being raised into or lowered out of the machine can be viewed by the machine operator, the approximate position of an assembly in the machine at any given moment being thereby determinable by the operator to assist in the correct operation of the machine controls.

The mechanism associated with the housing 61 and including the driving means 60 will now be described with reference to FIGURES 9, 10 and 11. The magazine cylinder 6 having the three magazine tubes, two designated 7 and 8 respectively being also shown in FIGURES 1B, 1C and 3–7 and the third (not shown in the latter figures) being designated 204 in FIGURES 9 and 10, has upper and lower end plates 205 and 206 respectively and is rotatable within a cylindrical casing 203 which has an internal flange 207 on which the magazine 6 is supported by a thrust bearing 208. Rotation of the magazine 6 is effected by an electric motor 202 (FIGURE 1A) provided with an emergency hand drive 201 (FIGURE 1A) and driving a shaft 212, a bevel wheel 211 and an annular bevel 213 on the magazine 6.

Each magazine tube has a sprocket 235 mounted on a shaft 234 journalled in bearings 237, 238 carried by the plate 205. Each shaft 234 has a driving cam 262 of elliptical cross-section which engages with its major axis more or less horizontal with an annular keyway 263 provided in a part 232 of the casing 61, the keyway 263 preventing rotation of the shafts 234 whilst allowing rotation of the magazine cylinder 6. The casing 61 is formed with a neck 264 having a flange 265 secured to a casing 287 housing the driving means 60. The neck has journalled in it a shaft 266 terminating in a coupling member 267 having a transverse slot 268 which when horizontal forms a continuation of the keyway 263. The shaft 266 is driven via a reduction gear 286, electromagnetic brake, cut-out and torque limiting device all generally indicated by the reference numeral 299 from an electric motor 295 provided with an emergency hand drive 200 (see also FIGURE 1A), these drive units constituting the driving means 60 and being housed (except for the hand drive 200) in the casing 287.

Each sprocket 235 carries a hoisting chain one run of which extends along the respective magazine tube and carries a seal plug. The chain extending along the tube 7 is the chain 9 and carries the seal plug 11, that in the tube 8 is the chain 10 carrying the seal plug 12 (see also FIGURES 1B, 1C and 3–7), and that in the tube 204 is designated 236 and carries a seal plug 261 (FIGURE 11). The other run of each chain has a loop 253 which exxends down a rectangular section channel 254 extending between the plates 205 and 206 (there being a channel 254 for each magazine tube) and carries a counterweight 255 provided with a sprocket 256, the free end of the chain being secured to a bracket 258 provided on the plate 205.

It will readily be appreciated that by operation of the motor 202, any one of the shafts 262 can be engaged with the driving means 60 and lifting and lowering can be effected up and down the respective magazine tube. The motor 202 is provided with limit switches (not shown) for locating the magazine cylinder 6 in the correct angular position for use of each magazine tube in turn. It will also be appreciated that the two shafts 262 which are uncoupled from the driving means 60 are held against rotation by engagement of the respective cams 262 in the keyway 263, thereby preventing rotation of the respective sprockets 235 and preventing longitudinal movement of the respective hoisting chains.

The gas valve and its operating mechanism will now be described with reference to FIGURES 12, 13 and 14.

The fuel element assembly 19 shown in FIGURE 12 and of which the gage valve 59 forms part comprises a connected string of fuel elements 51 joined via a distance piece 315 to the neutron shield scattering plug 52 which is itself joined via a distance piece 317 to an appliance 318 consisting broadly of a tubular support piece 319 having the gag valve 59 at its lower end and joined at its upper end to the biological shield plug 18. In the normal position of the fuel element assembly 19 in the reactor, the gag valve 59 is disposed near the upper transverse wall of the hot box 58 so that the gag valve 59 is inside the hot box. Coolant flows upwardly inside the fuel elements 51 (a suitable fuel element being for example the second embodiment shown and described in Belgian Patent No. 575,083) in contact with fuel rods thereof and passes upwardly through the neutron scattering plug 52 to the gag valve 59 from whence it passes outwardly to the hot box 58. The gag valve 59 is shown more particularly in FIGURE 13 and consists of a sleeve 321 having apertures 322 and a screw threaded collar 323 engaged by an external screw thread on an operating tube 324 extending upwardly and axially within the tubular support piece 319. The wall of the tubular support piece 319 at its lower end is also apertured at 325, and rotation of the operating tube 324 serves to move the sleeve 321 axially so that the apertures 322 therein change their registration with the apertures 325 in the support piece 319 to control the outward flow passage. Calandria tubes 311 of the hot box 58, in which the gag valves 59 are disposed, are each provided with registering apertures to permit coolant to flow from the respective gag valve 59 into the hot box 58. Referring now to FIGURE 14, the operating tube 324 extends upwardly to the biological shield plug 18 (which in operating position is sealed to the standpipe 4 by sealing rings 350) and projects therefrom by a small amount, its upper end having external splines 326. Below the splines 326, the operating tube 324 has an annular portion 327 of greater diameter which engages in an annular recess 328 in the biological shield plug 18, the portion 327 having annular seals 329 engaging the wall of the recess 328, thereby allowing the tube 324 to be rotated without breaking the integrity of the reactor coolant circuit. An internally splined sleeve 330 engages the splines 326 of the operating tube, the sleeve 330 having external splines 331 and being loaded by a spring 332 against downward movement in an annular recess 333 in the biological shield plug 18. The recess 333 has internal splines 334 which are short in length. Rotation of the operating tube 324 can be effected by engagement of a key (not shown) with its upper splined end, the key bearing on the top of the sleeve 330 and forcing it downwardly against the loading of its spring 332 sufficiently to cause disengagement of the sleeve splines 331 with the splines 334 in the annular recess 333 of the biological shield plug 18 and thereby freeing the operating tube 324 for rotation by the key. When the desired angular position of the operating tube 324 has been reached, release of the downward pressure on the key allows the sleeve 330 to rise and by engagement of the splines 331 and 334 lock the operating tube 324 in its adjusted position.

The operating tube 324 for the gag valve 59, instead of being engaged in a screw threaded collar on the gag valve sleeve 321, may alternatively be keyed to the gag valve sleeve 321, whereby, instead of the gag valve sleeve 321 being lowered or raised on rotation of the operating rod 324, it is rotated so that the apertures 322, 325 in the gag valve sleeve 321 and support piece 319 respectively are moved into and out of registration with one another.

The operating tube 324 conveniently forms a conduit for thermocouple leads, two such leads being shown by way of example in FIGURE 14 and designated 342.

The lowermost shielding of the refuelling machine which is movable to allow manual access to the telescopic coupling member for coupling and uncoupling thereof to the biological shield plug 18 of the fuel element assembly 19 will now be described with reference to FIGURES 15 and 16. The base part 410 of the refuelling machine 1 contains the nose pieces 3, 86 of the machine and straddles the refuelling level 5 of the reactor. The part 410 has shielding 412 with a cut-away part 413 at its base to accommodate additional shielding 414 which is movable vertically on a shaft 415 to close the gap between the base part 410 and the surface 5. In FIG. 15 the nose piece 3 is shown lowered into a space 438 to engage a standpipe 4 (not shown in FIGURE 15 but shown in FIGURE 1C).

The shielding 412 is built up of a series of blocks 439a, b, c, d which are stepped to avoid a free path for radiations escaping from the machine. The blocks 439a, 439b are stepped so that they may be moved relative to the remainder of the shielding 412 and opened to allow access to the hoisting gear. The movable blocks 439a, 439b are shown in FIG. 16 connected to the main shielding 12 by a hinge 440. Below the blocks 439a, 439b and disposed in a recess 413' therein is additional shield 441 corresponding to the additional shielding 414 connected to the main shielding 412. The additional shielding 441 is connected to the block 439a by shafts 442 and can be raised and lowered by means of a drive gear 443 operated by a handle 444. The additional shielding 414, 442 is provided with pads 445 which are loosely bolted to the shielding 414, 442 so as to take up any irregularities of the surface 5 on lowering of the shielding 414, 442.

The inner shielding is preferably of cast iron and the outer shielding is preferably of that nuclear shielding material sold under the trademark "Hydrobord."

The refuelling machine can be positioned so that either of its nose pieces 3, 86 is aligned with a standpipe 4 or with a transit tube to a storage facility (referred to hereinbefore in the description of operation). To this end, the machine has wheels 450 (FIGURE 1C) driven through reduction gearing from an electric motor 451, the wheels 450 running on rails (not shown) disposed on the refuelling level so as to be outside the standpipe area, the machine straddling that area. This allows the machine to be moved longitudinally. To provide lateral movement, the pressure vessel 2 and its associated nose pieces, shielding, magazines, coolant circuit etc., are mounted on a gantry 452 having wheels 453 driven through reduction gearing from coupled motors 454 (FIGURE 1B) and running on rails 455 which are at right angles to the rails on which the wheels 450 run.

We claim:

1. In a gas-cooled nuclear reactor having a pressure vessel enclosing a core structure which defines a lattice of fuel element channels, tubular fuel elements in the channels, and means for passing a gaseous coolant through said channels to cool the tubular fuel elements therein and access pipes which are aligned with said fuel channels through said pressure vessel, the provision of a refueling machine provided with at least one compartment for containing fuel elements having a nose piece sealable with said access pipes, means for feeding gas into said refueling machine, guide means for causing the fed gas to flow annular-wise through said nose piece out of the refueling machine into the reactor, means for withdrawing gas from said refueling machine at a discharge point more remote from the nose piece than the point of entry of said fed gas and restrictor means between the points of entry and discharge, said restrictor means operable, when the compartment is occupied by a tubular fuel element, to cooperate with a portion of a fuel element extending between said restrictor means towards said fuel element channels so as to prevent coolant flowing from the nose-piece to said discharge point without first passing through the interior of said fuel element.

2. In a gas cooled nuclear reactor having a refueling standpipe and a refueling machine as claimed in claim 1, a nose piece provided with a sliding seal adapted to be engaged with said refueling access pipe whereby the gas fed into said refueling machine is utilized to provide cooling for said seal during the engagement thereof with said refueling access pipe.

3. In a gas cooled nuclear reactor and refueling machine as claimed in claim 1, the provision in the refueling machine of means for moving a magazine having at least two compartments for fuel elements, means for moving the magazine to effect registration of each fuel element compartment with said access pipes, and means for selectively including one of said compartments in the circuit of gas fed into said refueling machine.

4. In a gas-cooled nuclear reactor having a pressure vessel enclosing a core structure which defines a lattice of fuel element coolant channels, tubular fuel elements within the channels, means for cooling the fuel elements by passing a gaseous coolant from end-to-end through the channels, wall means defining a coolant collecting chamber adjacent the coolant outlet ends of said channels and with which said outlet ends communicate, a lattice of access tubes aligned with the channels and penetrating the pressure vessel to extend into the chamber and means for drawing off coolant from the chamber and away from the pressure vessel, the provision of a refuelling machine provided with at least one compartment for storing fuel elements and having a tubular nose-piece of bore providing substantial clearance with the outer surface of a fuel element and sealable with each of said access tubes, means for feeding reactor coolant gas into the refuelling machine so as to flow along the wall of the nose-piece and into said chamber by way of connected access pipe, means for withdrawing reactor coolant gas from said refuelling machine at a discharge point whereby, when a tubular fuel element is disposed within the nose-piece, gas is drawn from said connected access pipe along the interior of the fuel element and wall means defining a restrictor operable, when the compartment is occupied by a fuel element, to cooperate with the outer surface of the fuel element so as to prevent coolant flowing from the nose-piece to said discharge point without first passing through said fuel element.

References Cited in the file of this patent

Millar: "Proceedings of the Second United Nations International Conference on the Peaceful Uses of Atomic Energy," vol. 8, pages 427–428, September 1958, United Nations Publication, N.Y.